US011535310B2

(12) United States Patent
Ben Arye

(10) Patent No.: US 11,535,310 B2
(45) Date of Patent: Dec. 27, 2022

(54) ANCHORING RAILS MECHANISM FOR SECURING A PASSENGER BOX REVERSIBLY INSERTABLE TO PICKUP TRUCKS BED, KIT AND METHODS THEREOF

(71) Applicant: Moshe Ben Arye, Arad (IL)

(72) Inventor: Moshe Ben Arye, Arad (IL)

( * ) Notice: Subject to any disclaimer, the term of this patent is extended or adjusted under 35 U.S.C. 154(b) by 0 days.

(21) Appl. No.: 17/621,392

(22) PCT Filed: Jun. 23, 2020

(86) PCT No.: PCT/IL2020/050699
§ 371 (c)(1),
(2) Date: Dec. 21, 2021

(87) PCT Pub. No.: WO2020/261267
PCT Pub. Date: Dec. 30, 2020

(65) Prior Publication Data
US 2022/0212728 A1     Jul. 7, 2022

Related U.S. Application Data

(60) Provisional application No. 62/865,217, filed on Jun. 23, 2019.

(51) Int. Cl.
*B62D 33/06*     (2006.01)
*B60N 2/015*     (2006.01)
(Continued)

(52) U.S. Cl.
CPC ......... *B62D 33/0636* (2013.01); *B60N 2/015* (2013.01); *B62D 33/0273* (2013.01)

(58) Field of Classification Search
CPC .......... B60N 2/005; B60N 2/01; B60N 2/015; B60N 2/01508; B60N 2/01516;
(Continued)

(56) References Cited

U.S. PATENT DOCUMENTS 2,559,029 A    7/1951  Randolph
3,485,522 A   12/1969  Reinarts
(Continued)

OTHER PUBLICATIONS

PCT Search Report for International Application No. PCT/IL2020/050699, dated Oct. 11, 2020, 3 pp.
(Continued)

*Primary Examiner* — Gregory A Blankenship
(74) *Attorney, Agent, or Firm* — The Roy Gross Law Firm, LLC; Roy Gross

(57) ABSTRACT

In pickup truck bed having longitudinal axis x, parallel to x longitudinal axis of said truck, lateral axis y perpendicular to x and on same horizontal plane and z being a vertical axis perpendicular to said xy plane, a rail mechanism comprising: on said bed, at least one first male or female rail disposed along axis x and at least one second male or female rail along z axis; on said box at least one first male or female rail disposed along axis x and at least one second male or female rail along z axis. Rails on the box are paired in a mateable manner with rails on said bed. Each rail in a mated pair having zero degrees of freedom of movement except for reciprocal linear movement along the x axis.

3 Claims, 3 Drawing Sheets

(51) Int. Cl.
  *B62D 33/063* (2006.01)
  *B62D 33/027* (2006.01)
(58) Field of Classification Search
  CPC .............. B60N 2/01525; B62D 33/0636;
    B62D 33/02; B62D 33/04; B62D 33/077;
    B62D 33/08; B62D 33/10; B60P 3/32;
    B60P 3/36; B60P 3/42
  See application file for complete search history.

(56) References Cited

U.S. PATENT DOCUMENTS

| | | | | |
|---|---|---|---|---|
| 6,270,137 | B1* | 8/2001 | Minix | B60P 3/36 |
| | | | | 312/246 |
| 6,712,568 | B2 | 3/2004 | Snyder et al. | |
| 6,932,408 | B1* | 8/2005 | Lyod, Jr | B60N 2/005 |
| | | | | 5/118 |
| 6,955,391 | B1 | 10/2005 | Peng | |
| 2005/0168022 | A1* | 8/2005 | Brown | B60N 2/24 |
| | | | | 297/256.16 |
| 2006/0267367 | A1* | 11/2006 | Burgess | B60N 2/68 |
| | | | | 296/68.1 |
| 2007/0216187 | A1* | 9/2007 | Hyde | B60N 2/015 |
| | | | | 296/64 |
| 2008/0067829 | A1* | 3/2008 | Arias | B60R 22/22 |
| | | | | 296/65.03 |
| 2010/0019523 | A1* | 1/2010 | Fletcher | B60N 3/002 |
| | | | | 296/64 |
| 2011/0291444 | A1 | 12/2011 | Ische | |
| 2011/0309227 | A1* | 12/2011 | Marshall | B60N 2/01541 |
| | | | | 248/560 |
| 2017/0028900 | A1 | 2/2017 | Stocks et al. | |
| 2021/0155125 | A1* | 5/2021 | Erlacher | B60N 2/20 |

OTHER PUBLICATIONS

PCT Written Opinion for International Application No. PCT/IL2020/050699, dated Oct. 11, 2020, 5 pp.
PCT Preliminary Report on Patentability for International Application No. PCT/IL2020/050699, dated Oct. 11, 2021, 27 pp.
Winston, F K., et al. "Risk of Injury to Child Passengers in Compact Extended-Cab Pickup Trucks." JAMA 287 (2002): 1147-1152.
Agran, P., and Diane W. "Injuries to Occupants in Cargo Areas of Pickup Trucks." (1990).
Dakin, Gregory J., et al. "Insurance institute for highway safety side impact crashworthiness evaluation program: impact configuration and rationale." 18th ESV Conference, Nagoya. 2003.

* cited by examiner

ANCHORING RAILS MECHANISM FOR SECURING A PASSENGER BOX REVERSIBLY INSERTABLE TO PICKUP TRUCKS BED, KIT AND METHODS THEREOF

CROSS REFERENCE TO RELATED APPLICATIONS

This application is a National Phase of PCT Patent Application No. PCT/IL2020/050699 having International filing date of Jun. 23, 2020, which claims the benefit of priority of U.S. Provisional Patent Application No. 62/865,217, filed Jun. 23, 2019, the contents of which are all incorporated herein by reference in their entirety.

FIELD OF THE INVENTION

The present invention pertains to an anchoring rails mechanism for securing a passenger-box which is reversibly insertable to a pickup trucks bed, to a kit comprising rails and passengers box and to and methods for securing a passenger-box within a pick up bed.

BACKGROUND OF THE INVENTION

Vehicles having an open cargo area with low sides and tailgate, such as pickup trucks, are not suitable nor allowed for passengers' transportation in most countries, even though exceptions are known, e.g., more than 19 countries within the USA etc. Anderson et al. described the fatalities to occupants of pickup truck cargo areas and to compare the mortality of cargo area occupants to passengers in the cab. From the Fatality Analysis Reporting System (FARS) files for 1987-1996, they identified occupants of pickup trucks with at least one fatality and at least one passenger in the cargo area. Outcomes of cargo area occupants and passengers in the cab were compared using estimating equations conditional on the crash and vehicle. Thirty-four percent of deaths to cargo occupants were in non-crash events without vehicle deformation. Fifty-five percent of those who died were age 15-29 years and 79% were male. The fatality risk ratio (FRR) comparing cargo area occupants to front seat occupants was 3.0. The risk was 7.9 times that of restrained front seat occupants. The FRR ranged from 92 in non-crash events to 1.7 in crashes with severe vehicle deformation. The FRR was 1.8 for occupants of enclosed cargo areas and 3.5 for occupants of open cargo areas. They conclude that passengers in cargo areas of pickup trucks have a higher risk of death than front seat occupants, especially in non-crash events, and that camper shells offer only limited protection for cargo area occupants, see Anderson, C L., et al. "Fatalities to occupants of cargo areas of pickup trucks." Accident Analysis & Prevention 32.4 (2000): 533-540.

Restrained rear-seated occupants are common in pickups bed. These extended-cab models may be viewed as family vehicles by parents who want to follow safety recommendations that children be placed in the rear seat. However, little is known about the relative safety of pickup trucks for rear-seated occupants, particularly children. Current compact extended-cab pickup trucks typically have small rear occupant compartments and most have side-facing, fold-down, or "jump" seats that are considered auxiliary, non-standard seats by manufacturers and by the National Highway Traffic Safety Administration. In contrast, current full-size extended-cab pickup trucks, similar to other vehicles, typically have larger rear-occupant compartments and standard bench seats. Manufacturers' instructions recommend that children be seated in the front seat of compact extended-cab pickup trucks in appropriate child restraints rather than in the auxiliary seats. The National Highway Traffic Safety Administration exempts these auxiliary jump seats from regulatory testing, and, as such, the relative safety of these seats has not been determined until recently, when Winston et al. analyzed results injuries that were reported for 1356 children, representing 1.6% of the nation population. Children in compact extended-cab pickup trucks were at greater risk of injury than children in other vehicles. Children in the rear seats of compact pickup trucks were at substantially greater risk of injury than rear-seated children in other vehicles Children seated in the front seat of compact extended-cab pickup trucks were at greater risk of injury than children in the front seats of other vehicles, but this risk was not statistically significant, see Winston, F K., et al. "Risk of Injury to Child Passengers in Compact Extended-Cab Pickup Trucks." JAMA 287 (2002): 1147-1152. Very similar results were published earlier: Crashes with passengers in the cargo area resulted in death in 5% of passengers. Among the 1,685 passengers in the cargo area, 65% were male, 36% were younger than 15 years, and 30% were ages 15 to 19 years. Passengers in the cargo area were more frequently ejected and more seriously injured than their counterparts in the cab, see Agran, P., and Diane W. "Injuries to Occupants in Cargo Areas of Pickup Trucks." (1990).

For all vehicles sold in the United States, Federal Motor Vehicle Safety Standard (FMVSS) 201, Occupant Protection in Interior Impact (49 CFR 571.201) Section S5.2 requires that the portion of the seat back that is within the head impact area be tested by a prescribed procedure except in the case of side-facing, folding auxiliary jump seats. Section S5.2.1 of Standard 201 states that the testing requirements do not apply to such temporary seats. Therefore, testing for occupant protection in interior impact is not required for the rear seats in most compact pickup trucks.

The Insurance Institute for Highway Safety (IIHS) has begun a new side impact crashworthiness evaluation program using tests that represent impacts from large pickup trucks or sport utility vehicles. Such vehicles are increasingly common in the North American fleet and often are the striking vehicles in side impacts with serious injuries. Earlier reports document the research underpinning the design of the new IIHS moving deformable barrier (MDB) and the selection of the SID-IIs dummy for the driver and left rear passenger positions. In this report, research is discussed in which alternative mass (1,500 or 1,900 kg), impact speed (48.3 or 50.0 km/h), and approach angle (crabbed or perpendicular) of the MDB were investigated. Impact speed affected dummy injury measures and kinematics more than mass or approach angle. Based on these results, the impact configuration for the side impact program specifies a 1,500 kg MDB, a perpendicular impact into the side of a stationary vehicle, and a test speed of 50.0 km/h; see MBD-IIHS Report, namely Dakin, Gregory J., et al. "Insurance institute for highway safety side impact crashworthiness evaluation program: impact configuration and rationale." 18th ESV Conference, Nagoya. 2003, currently available at http://citeseerx.ist.psu.edu/viewdoc/download?doi=10.1.1.454 . 240&rep=rep1&type=pdf; See also Chapter 2 ("Background") in U.S. Pat. No. 6,955,391, incorporated herein also as a reference.

Sliding cargo bed trays are known in the art. Trays are incorporated on top of a horizontal rail system. Many commercially available rail system comprises wheels to smooth the linear reciprocation of the tray on the rail. Those rails, trays and systems thereof are designed for accommodating lightweight cargo, are not secure, namely not standing 49 CFR 571.201 Section S5.2 requirements and thus are not suitable for passengers' transportation. A secure sliding passenger compartment configured to be reversibly affixed within a pickup truck bed are hence still an unmet need.

SUMMARY OF THE INVENTION

A secure sliding passenger compartment configured to be reversibly affixed within a pickup truck bed is presented herein after.

It is hence an object of the invention to disclose, in pickup truck bed having longitudinal axis x, parallel to x longitudinal axis of the truck, lateral axis y perpendicular to x and on same horizontal plane and z being a vertical axis perpendicular to the xy plane, a rail mechanism.

The rail mechanism comprises, on this bed, at least one first male or female rail disposed along axis x and at least one second male or female rail along z axis. The rail mechanism further comprises, on the passenger compartment, namely, 'the box', at least one first male or female rail disposed along axis x and at least one second male or female rail along z axis. Rails on the box are paired in a mateable manner with rails on the bed. Each rail in a mated pair is having zero degrees of freedom of movement except for reciprocal linear movement along the x axis. This mechanism is providing an anchoring to the bed and isolation from the chassis. The rail mechanism is isolating passengers that are anchored to the seats of the box, from the truck chassis. This anchoring is conforming to the impact configuration specified in MBD-IIHS Report defined in the Background section above, namely, providing passenger(s) protection from 500 kg or more MDB in side-on perpendicular impact to a stationary pickup truck's bed, at a test speed of 50.0 km/h when the chassis is subjected to same impact.\

It is another object of the invention to disclose q kit for isolating seated and anchored passengers in a passenger box from the chassis of the truck comprising rails as defined above.

Another object of the invention is to disclose a method for isolating seated and anchored passengers in a passenger box from the chassis of the truck. The method comprises steps of providing, in a pickup truck bed having longitudinal axis x, parallel to x longitudinal axis of the truck, lateral axis y perpendicular to x and on same horizontal plane and z being a vertical axis perpendicular to the xy plane, a rail mechanism; this mechanism is providing an anchoring to the bed and isolation from the chassis. On the bed, providing in the rail mechanism on the bed, at least one first male or female rail disposed along axis x and at least one second male or female rail along z axis. On the box, providing at least one first male or female rail disposed along axis x and at least one second male or female rail along z axis. Another step is pairing rails on the box in a mateable manner with rails on the bed. Other step is providing each rail in a mated pair with zero degrees of freedom of movement except for reciprocal linear movement along the x axis. By means of the rail mechanism, step of isolating passengers, anchored to the seats of the box, from the truck chassis is also provided. The the anchoring is conforming to the impact configuration specified in MBD-IIHS Report, namely passenger protection from an 500 kg MDB in side-on perpendicular impact to a stationary pickup truck's bed, at a test speed of 50.0 km/h when the chassis is subjected to same.

BRIEF DESCRIPTION OF DRAWINGS

The invention may be more completely understood in consideration of the following detailed description of various embodiments of the invention in connection with the accompanying drawings, in which FIGS. 1-3 disclose the rail mechanism for a pickup truck bed as disclosed and defined in this invention.

BRIEF DESCRIPTION IF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures and components have not been described in detail to avoid unnecessary obscuring aspects of the present invention. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The term "Pickup trucks" referees, inter alia, to trucks with an open cargo bed behind a closed cab. Pickup trucks are classified as extended-cab (having 2 rows of seats) or regular cab (1 passenger row only). Compact pickup trucks are defined as those with a gross vehicle weight rating (truck weight plus carrying capacity) of less than 2,722 kg. Compact pickup trucks weigh more than most passenger cars but are comparable in weight with sport utility vehicles and minivans. For classification based on cab type, the vehicle identification number was decoded using Vindicator (Insurance Institute for Highway Safety/Highway Loss Data Institute, Arlington, Va.). Rear-seated children were believed to contribute to the excessive risk of compact extended-cab pickup trucks.

Figure 1A:
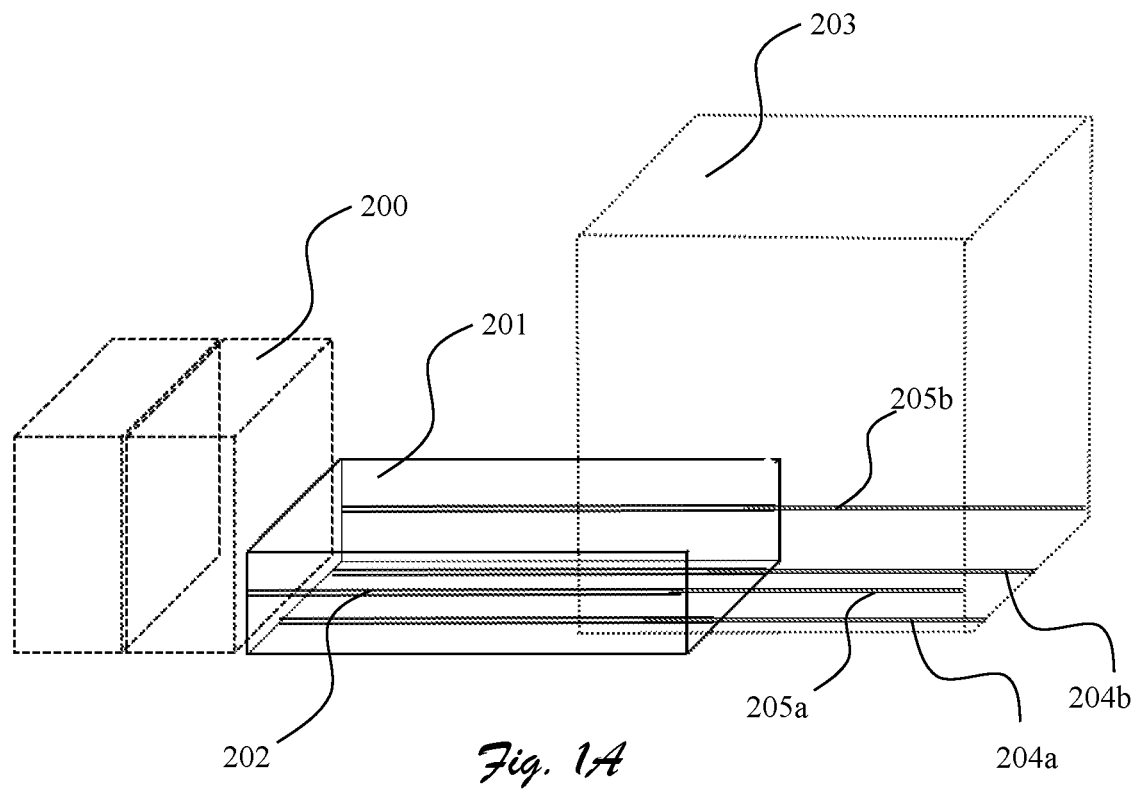
Figure 1B:
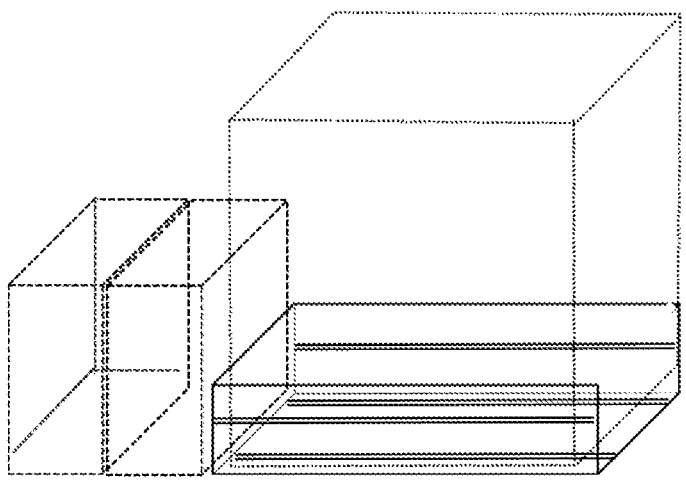

Reference is now made to FIG. 1A-B that illustrate a sliding passenger compartment according to one embodiment of the invention. A pickup truck 200 comprising a plurality of rails, temporarily of not affix to truck's bed (201). In this embodiment, two parallel rails are affixed on bed's floor (204A-B) and additionally to parallel rails are affixed to bed's sidewalls 202, namely rails 205A-B. A sliding yet secured passenger compartment 203 is set on the rail to linearly reciprocate along the rails from an OUTSIDE configuration (FIG. 1A) to an INSIDE (secured) configuration (FIG. 1B).

In an embodiment of the invention, the dimensions of the rail smaller than the dimensions of the outer rail-cover, providing substantially frictionless engagement between the rail and the outer rail cover. In another embodiment of the invention, at least one dimension of the rail is raised, as a stopper (508, FIG. 3B), to mechanically engage the outer rail cover. The stopper (508, FIG. 3B) thereby providing at least partial resistance to reciprocal movement of the rail cover. Thus, as an example, in a rail (150 cm long), the external height of the rail is 0.25-0.50 cm shorter than the height inner portion of the outer rail cover; whereas at three separated segments along the rail, 30 cm each, located adjacent to the two ends of the rail and along its middle portion, the external height of the rail is 0-0.15 cm shorter than the height inner portion of the outer rail cover.

Figure 2:
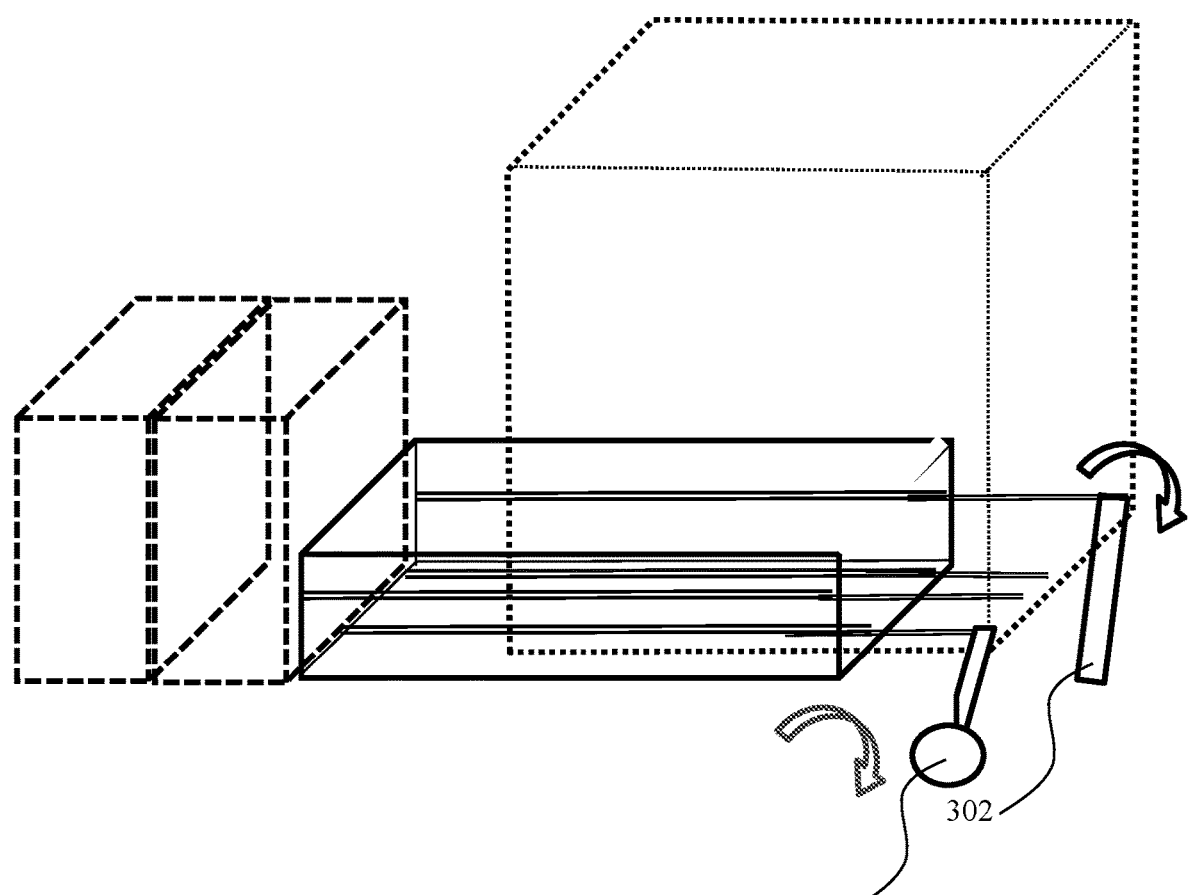

Reference is now made to FIG. 2 that illustrate a sliding passenger compartment according to another embodiment of the invention. The passenger compartment comprises extendable, collapsible, sliding, retractable or foldable support, such one or more wheeled supports (301) or rigid legs (302).

A plurality of rail profiles available in the market can be used in another set of embodiments of the invention. Much schematically in an out of scale manner, a rail profile is characterized by a flat bottom, a foot portion, a web portion, and a head portion. Various configurations of the same provide for both secured sliding and immobilizing properties for of the passenger compartment, e.g., a bull head rail, a grooved tram rail, either "closed arms" C-shaped, T-shaped, S-shaped (double tracks rail), H-shaped, X-shaped, V-shaped (dove-tail shape) or U-shaped profiles. A multiple "open arms" profile, such as opposite C-shaped profile 406 is similarly effective. Those rail-assemblies configured to provide a single degree of freedom, namely, a reciprocal linear actuation along the main longitudinal axis of the rail. A stopper (508, FIG. 3B) affixed in the rear end of the rails effectively secure the passengers' compartment lock to truck's bed, thereby to vehicle's chassis.

It is further in the scope of the invention wherein other embodiments are variations of an O-shaped profile characterized by more than 1 degree of freedom, such as restricted rotation along the rail main longitudinal axis. Hence, a female U-shape (horseshoe-like cross section) member is configured to longitudinal axis of slide along the main longitudinal axis of a male O-shape.

Figure 3A:
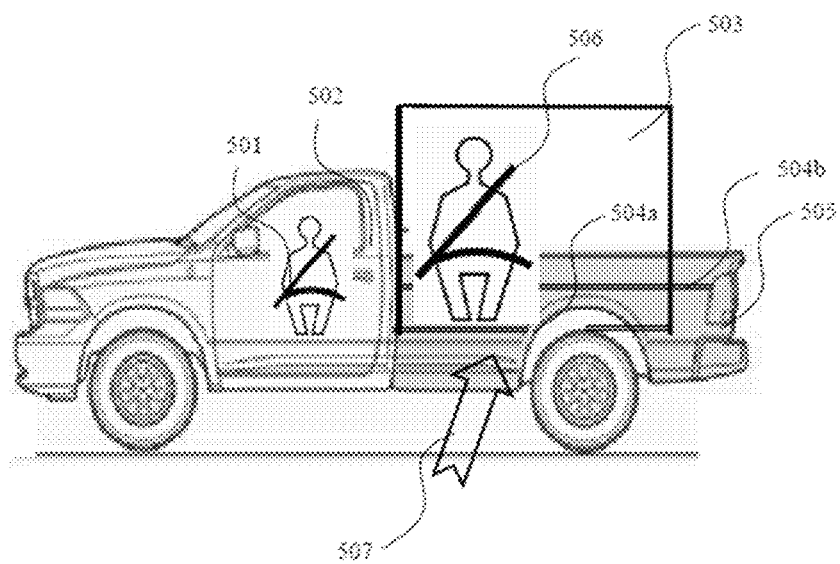
Figure 3B:
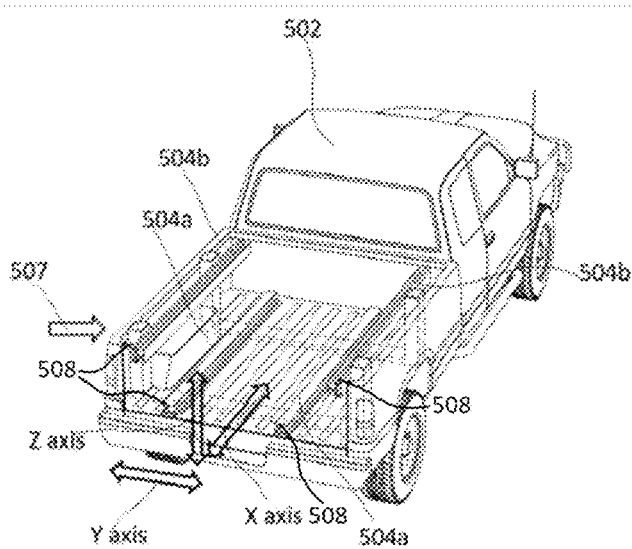

Reference is now made to FIGS. 3A and 3B, both presenting an embodiment of the invention. A pickup truck bed (505) having longitudinal axis x, parallel to x longitudinal axis of the truck, lateral axis y perpendicular to x and on same horizontal plane and z being a vertical axis perpendicular to the xy plane is disclosed. A rail mechanism comprising: on the bed, at least one first male or female rail disposed along axis x (504a, right side of the truck, a second rail, provided on the left side is not shown here) and at least one second male or female rail along z axis (504b, right side of the truck, a second rail, provided on the left side is not shown here). On the box 503, at least one first male or female rail disposed along axis x and at least one second male or female rail along z axis; rails on the box paired in a mateable manner with rails on the bed. Each rail in a mated pair having zero degrees of freedom of movement except for reciprocal linear movement along the x axis. The mechanism is providing anchoring to the bed (505) and isolation from the chassis 502. The rail mechanism isolating passengers (506), anchored to the seats of the box, from the truck chassis (502), the anchoring is conforming to a side (507) impact configuration specified in MBD-IIHS Report, namely passenger protection from an 500 kg MDB in side-on perpendicular impact to a stationary pickup truck's bed, at a test speed of 50.0 km/h when the chassis is subjected to same.

Reference is still made to FIGS. 3A and 3B, both presenting another embodiment of the invention, namely a method for isolating seated and anchored passengers in a passenger box from the chassis of the truck. Passengers that sit within the truck cabin (501), wearing their security belts are directly and securely anchored to truck's chassis (502). By the gereto disclosed invention, passengers that sit within the passengers' compartment (box) and wearing their securing belts are indirectly anchored to the truck's chassis, nevertheless, are equally secured because of the hereto disclosed rails system. The method hence comprises steps of providing, in this pickup truck bed 505 having longitudinal axis x, parallel to x longitudinal axis of the truck, lateral axis y perpendicular to x and on same horizontal plane and z being a vertical axis perpendicular to the xy plane, the aforesaid rail mechanism. The mechanism providing anchoring to the bed and isolation from the chassis. On this bed, providing in the rail mechanism on the bed, at least one first male or female rail disposed along axis x and at least one second male or female rail along z axis. On the box, providing at least one first male or female rail disposed along axis x and at least one second male or female rail along z axis. The method further comprises steps of pairing rails on the box in a mateable manner with rails on the bed; and providing each rail in a mated pair with zero degrees of freedom of movement except for reciprocal linear movement along the x axis. By means of the rail mechanism, isolating passengers, anchored to the seats of the box, from the truck chassis, the anchoring conforming to the impact configuration specified in MBD-IIHS Report, namely passenger protection from an 500 kg MDB in side-on perpendicular impact to a stationary pickup truck's bed, at a test speed of 50.0 km/h when the chassis is subjected to same.

The invention has been described using exemplary preferred embodiments. However, for those skilled in this field, the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

The invention claimed is:

1. In a pickup truck comprising a truck bed, a chassis and a passenger box, said truck bed having longitudinal axis x, parallel to x longitudinal axis of said pickup truck, lateral axis y perpendicular to x and on same horizontal plane and z being a vertical axis perpendicular to said xy plane, a rail mechanism comprising: on said truck bed, at least one first male or female bed rail disposed along axis x and disposed on a floor of said truck bed and at least one second male or female bed rail along said x axis and disposed on a longitudinal sidewall of said truck bed; on said passenger box, at least one first male or female box rail disposed along axis x and disposed on a bottom of said passenger box and at least one second male or female box rail along said x axis and disposed on a sidewall of said passenger box; rails on said passenger box paired in a mateable manner with rails on said truck bed; each rail in a mated pair having zero degrees of freedom of movement except for reciprocal linear movement along the x axis, said rail mechanism providing anchoring to the truck bed and isolation from the chassis; said rail mechanism isolating passengers, anchored to seats of said passenger box, from the chassis, said rail mechanism anchoring configured by means of shape and size to conform to an impact configuration specified in MBD-IIHS Report, namely passenger protection from a 500 kg MDB in side-on perpendicular impact to a stationary truck bed, at a test speed of 50.0 km/h when said chassis is subjected to same;

wherein a stopper affixed to a rear end of at least one of a group consisting of said at least one first male or female bed rail, said at least one second male or female bed rail, said at least one first male or female box rail, said at least one second male or female box rail, and any combination thereof, said stopper configured by means of shape and size to effectively secure locking of the passenger box to the truck bed.

2. A kit for isolating seated and anchored passengers in a passenger box comprising one or more seats; from a chassis of a pickup truck comprising said at least one first male or female bed rail, said at least one second male or female bed rail, said at least one first male or female box rail, and said at least one second male or female box rail as defined in claim 1 suitable for a predefined truck bed;
   wherein a stopper affixed to a rear end of at least one of a group consisting of said at least one first male or female bed rail, said at least one second male or female bed rail, said at least one first male or female box rail, said at least one second male or female box rail, and any combination thereof, said stopper configured by means of shape and size to effectively secure locking of the passenger box to the truck bed.

3. A method for isolating seated and anchored passengers in a passenger box on a pickup truck comprising a truck bed and a chassis, said isolation of said seated and anchored passengers from the chassis comprising steps of:
   providing, in said truck bed having longitudinal axis X, parallel to x longitudinal axis of said pickup truck, lateral axis y perpendicular to x and on same horizontal plane and z being a vertical axis perpendicular to said xy plane, a rail mechanism, said rail mechanism providing anchoring to the truck bed and isolation from the chassis;
   on said truck bed, providing in the rail mechanism at least one first male or female bed rail disposed along axis x and disposed on a floor of said truck bed and at least one second male or female bed rail along said x axis and disposed on a longitudinal sidewall of said truck bed;
   on said passenger box, providing at least one first male or female box rail disposed along axis x and disposed on a bottom of said passenger box and at least one second male or female box rail along said x axis and disposed on a sidewall of said box;
   pairing said at least one first male or female box rail and said at least one second male or female box rail in a mateable manner with said at least one first male or female bed rail and said at least one second male or female bed rail;
   providing each rail in a mated pair with zero degrees of freedom of movement except for reciprocal linear movement along the x axis,
   by means of said rail mechanism, isolating passengers, anchored to seats of said passenger box, from the chassis, said rail mechanism anchoring configured by means of shape and size to conform to an impact configuration specified in MBD-IIHS Report, namely passenger protection from a 500 kg MDB side-on perpendicular impact to a stationary truck bed, at a test speed of 50.0 km/h when said chassis is subjected to same;
   wherein a stopper affixed to a rear end of at least one of a group consisting of said at least one first male or female bed rail, said at least one second male or female bed rail, said at least one first male or female box rail, said at least one second male or female box rail, and any combination thereof, said stopper configured by means of shape and size to effectively secure locking of the passenger box to the truck bed.

\* \* \* \* \*